(12) United States Patent
Hicks (10) Patent No.: US 9,555,844 B2
(45) Date of Patent: Jan. 31, 2017

(54) SLIDER SUSPENSION ASSEMBLY WITH COMPLIANT HOLD-DOWN ARRANGEMENT

(71) Applicant: SAF-HOLLAND, Inc., Holland, MI (US)

(72) Inventor: William J. Hicks, Muskegon, MI (US)

(73) Assignee: SAF-HOLLAND, Inc., Holland, MI (US)

(*) Notice: Subject to any disclaimer, the term of this patent is extended or adjusted under 35 U.S.C. 154(b) by 0 days.

(21) Appl. No.: 14/820,165

(22) Filed: Aug. 6, 2015

(65) Prior Publication Data

US 2016/0096408 A1  Apr. 7, 2016

Related U.S. Application Data

(60) Provisional application No. 62/058,913, filed on Oct. 2, 2014.

(51) Int. Cl.
| | |
|---|---|
| *B62D 53/06* | (2006.01) |
| *B62D 53/08* | (2006.01) |
| *B60G 99/00* | (2010.01) |

(52) U.S. Cl.
CPC ........... *B62D 53/068* (2013.01); *B60G 99/002* (2013.01); *B62D 53/0828* (2013.01); *B60G 2200/314* (2013.01); *B60G 2202/152* (2013.01); *B60G 2204/10* (2013.01); *B60G 2204/15* (2013.01); *B60G 2204/4232* (2013.01); *B60G 2204/4302* (2013.01); *B60G 2204/61* (2013.01); *B60G 2206/604* (2013.01); *B60G 2300/0262* (2013.01); *B60G 2300/40* (2013.01)

(58) Field of Classification Search
CPC ... B62D 53/0828; B62D 53/068; B60G 5/005; B60G 2300/04; B60G 2204/15; B60G 99/002; B60G 2200/314; B60G 2204/10; B60G 2204/4232; B60G 2204/61; B60G 2202/152; B60G 2300/0262; B60G 2206/604; B60G 2300/40; B60G 2204/4302

See application file for complete search history.

(56) References Cited

U.S. PATENT DOCUMENTS

| | | | |
|---|---|---|---|
| 2,839,311 | A | 6/1958 | Locker |
| 3,044,796 | A | 7/1962 | Andrews |
| 3,085,816 | A | 4/1963 | Tantlinger et al. |
| 3,096,993 | A | 7/1963 | McKay |
| 3,372,946 | A | 3/1968 | Hutchens |
| 3,950,011 | A | 4/1976 | Yamanaka |

(Continued)

FOREIGN PATENT DOCUMENTS

| | | | |
|---|---|---|---|
| DE | 102014007884 A1 * | 10/2014 | ............. B62D 61/12 |
| FR | WO 2008139107 A1 * | 11/2008 | ........... B62D 21/155 |
| WO | WO 0196171 A1 * | 12/2001 | ............... B60G 7/02 |

*Primary Examiner* — Drew Brown
(74) *Attorney, Agent, or Firm* — Price Heneveld LLP (57) ABSTRACT

A vehicle suspension assembly includes a vehicle frame rail, a slide rail extending longitudinally along the vehicle frame rail and slidably adjustable thereto, a support bracket extending downwardly from the slide rail, a trailing arm pivotably coupled to the support bracket, a spring member positioned between the trailing arm and the slide rail, and an elastically resilient coupling arrangement coupling the slide rail to the vehicle frame rail, wherein the coupling member is configured to elastically deform during vertical displacement of the vehicle frame rail with respect to the slide rail.

27 Claims, 8 Drawing Sheets

(56) References Cited

U.S. PATENT DOCUMENTS

| | | | | |
|---|---|---|---|---|
| 5,088,758 A * | 2/1992 | Wall et al. | B60G 5/005 | 280/149.2 |
| 5,088,763 A * | 2/1992 | Galazin et al. | B60G 9/04 | 280/124.109 |
| 5,135,165 A * | 8/1992 | Greenhow | E01B 9/66 | 238/338 |
| 5,137,296 A * | 8/1992 | Forman | B62D 53/068 | 180/209 |
| 5,378,006 A * | 1/1995 | Stuart et al. | B62D 53/068 | 280/149.2 |
| 5,460,237 A * | 10/1995 | Schueman | B62D 53/068 | 180/209 |
| 5,460,397 A | 10/1995 | Shielman | | |
| 5,470,096 A * | 11/1995 | Baxter | B60G 9/003 | 267/241 |
| 5,507,511 A * | 4/1996 | Schueman | B62D 53/068 | 180/209 |
| 5,531,467 A * | 7/1996 | Schueman | B62D 53/068 | 180/209 |
| 5,558,369 A * | 9/1996 | Cornea et al. | F16B 37/044 | 280/781 |
| 5,564,725 A | 10/1996 | Brazeal | | |
| 6,213,489 B1 * | 4/2001 | Eckelberry | B62D 53/068 | 180/209 |
| 6,305,615 B1 * | 10/2001 | Traktovenko | B66B 7/02 | 187/408 |
| 6,409,192 B1 * | 6/2002 | Botts | B60G 5/06 | 180/24.02 |
| 6,550,798 B2 * | 4/2003 | MacKarvich | B60G 3/145 | 180/906 |
| 6,702,310 B2 * | 3/2004 | Browning | B60G 17/005 | 248/200 |
| 6,719,315 B2 | 4/2004 | Saieg et al. | | |
| 7,163,220 B2 * | 1/2007 | Pappas | F16F 1/12 | 280/149.2 |
| 7,303,200 B2 * | 12/2007 | Ramsey | B62D 21/02 | 280/124.109 |
| 7,416,204 B2 * | 8/2008 | Hicks et al. | B60G 7/02 | 280/124.128 |
| 7,497,293 B2 * | 3/2009 | Saieg et al. | B60T 7/10 | 180/209 |
| 7,503,414 B2 * | 3/2009 | Pierce et al. | B60G 9/003 | 180/209 |
| 8,025,302 B2 * | 9/2011 | Saieg et al. | B62D 53/0814 | 180/209 |
| 8,256,782 B2 * | 9/2012 | Vandenberg et al. | B60G 11/225 | 267/189 |
| 8,272,654 B2 * | 9/2012 | Xie | B62D 53/067 | 180/209 |
| 8,888,135 B1 * | 11/2014 | Reitnouer | B62D 21/11 | 280/781 |
| 2007/0017715 A1 * | 1/2007 | McCann | B60G 17/0523 | 180/24.02 |
| 2007/0024017 A1 * | 2/2007 | Ramsey | B62D 53/068 | 280/149.2 |
| 2007/0228686 A1 * | 10/2007 | Gerstenslager et al. | B62D 53/068 | 280/149.2 |

* cited by examiner

SLIDER SUSPENSION ASSEMBLY WITH COMPLIANT HOLD-DOWN ARRANGEMENT

BACKGROUND OF THE INVENTION

The present invention relates to vehicle suspension assembly comprising in particular to a slider suspension assembly that includes an elastically resilient coupling arrangement that couples a slide rail to an associated vehicle frame rail thereby reducing the impact loading exerted on the associated components during a vertical displacement of the vehicle frame rail with respect to the slide rail.

SUMMARY OF THE INVENTION

One aspect of the present invention is a vehicle suspension assembly that includes a vehicle frame rail, a slide rail extending longitudinally along the vehicle frame rail and slidably adjustable with respect to the vehicle frame rail, a support bracket extending downwardly from the slide rail, a trailing arm pivotably coupled to the support bracket, and a spring member positioned between the trailing arm and the slide rail. The vehicle suspension further includes an elastically resilient coupling arrangement coupling the slide rail to the vehicle frame rail, wherein the coupling member is configured to elastically deform during vertical displacement of the vehicle frame rail with respect to the slide rail.

Another aspect of the present invention is a vehicle suspension assembly that includes a slide rail configured to extend longitudinally along a vehicle frame rail and configured to be slidably adjustable with respect to the vehicle frame rail, a support bracket extending downwardly from the slide rail, a trailing arm pivotably coupled to the support bracket, a spring member positioned between the trailing arm and the slide rail, and an elastically resilient coupling arrangement configured to couple the slide rail to the vehicle frame rail, wherein the coupling member is configured to elastically deform during vertical displacement of the vehicle frame rail with respect to the slide rail.

Yet another aspect of the present invention is a coupling arrangement for use with a vehicle suspension assembly that includes a vehicle frame rail, a slide rail extending longitudinally along the vehicle frame rail and slidably adjustable with respect to the vehicle frame rail, a support bracket extending downwardly from the slide rail, a trailing arm pivotably coupled to the support bracket, a spring member positioned between the trailing arm and the slide rail. The coupling arrangement includes a first bracket configured to slidably engage the vehicle frame rail, a second bracket configured to abut the slide rail, and an elastically resilient pad positioned between the first and second brackets and that is configured to elastically deform during vertical displacement of the vehicle frame rail with respect to the slide rail.

The present inventive vehicle suspension assembly provides a more durable arrangement that protects the associated components against impact loading and fatigue-type fractures that may develop leading to ultimate rupture in the overall structure.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
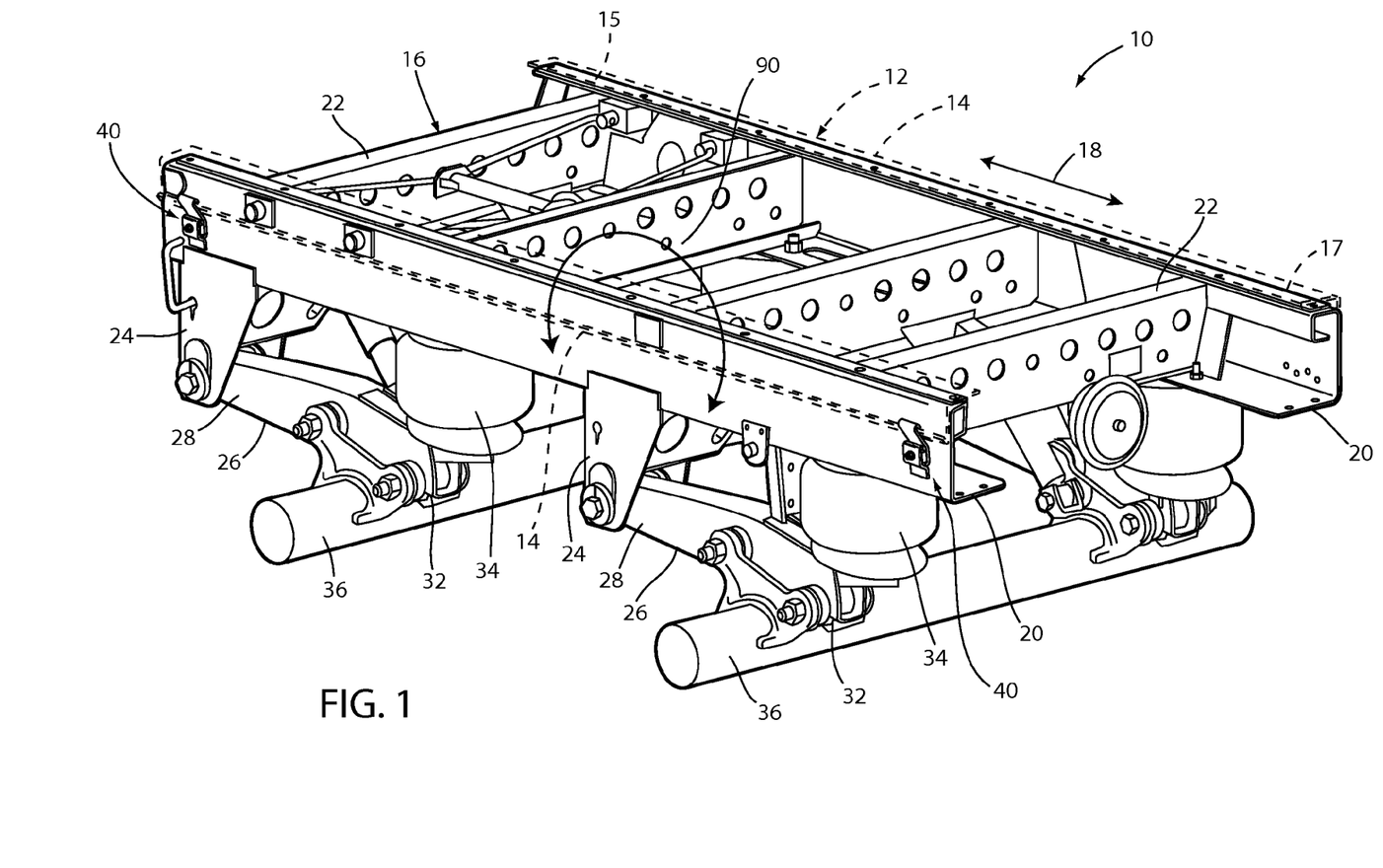
FIG. 1 is a perspective view of a vehicle suspension assembly embodying the present invention and including an elastically resilient coupling arrangement.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a vehicle suspension assembly embodying the present invention. In the illustrated example, the vehicle suspension assembly comprises a vehicle frame assembly 12 that includes a pair of elongated vehicle frame rails 14, supporting a slider arrangement 16 slidably adjustable with respect to the vehicle frame rails 14 in directions 18, wherein the vehicle frame rails 14 each include a forward end 15 and a rearward end 17. Specifically, the slider arrangement includes a pair of slider rails 20 extending longitudinally along the corresponding vehicle frame rails 14, and a plurality of cross support members 22 extending between the slide rails 20. The vehicle suspension assembly 10 further includes a plurality of support brackets 24 attached to and extending downwardly from the slider rails 20. A plurality of trailing arms 26 are pivotably coupled at a first end 28 to an associated support bracket 24. A second end 32 of each of the trailing arms 26 supports an associated air spring 34 positioned between the second end 32 of the trailing arm 26 and the slider rail 20. An axle member is attached to a pair of trailing arms 26 along the respective lengths thereof.

The vehicle suspension assembly 10 further includes a plurality of elastically resilient coupling arrangements 40 that couple the slide rails 20 to the vehicle frame rails 14. Each coupling arrangement 40 (FIGS. 2 and 4) includes a first bracket 42, a second bracket 44 and an elastically resilient biasing or bushing member 46 located therebetween. In the illustrated example, the first bracket 42 includes a downwardly opening, C-shaped upper end 48, a planar body portion 50, and an outwardly extending lip or bottom portion 52. The second bracket 44 includes an inwardly curved upper portion 54, a planar body portion 56, and a downwardly extending bottom portion 58 inwardly offset from the body portion 56. The biasing or bushing member 46 preferably comprises an elastomeric material, and more preferably comprises rubber or a urethane material.

Figure 2:
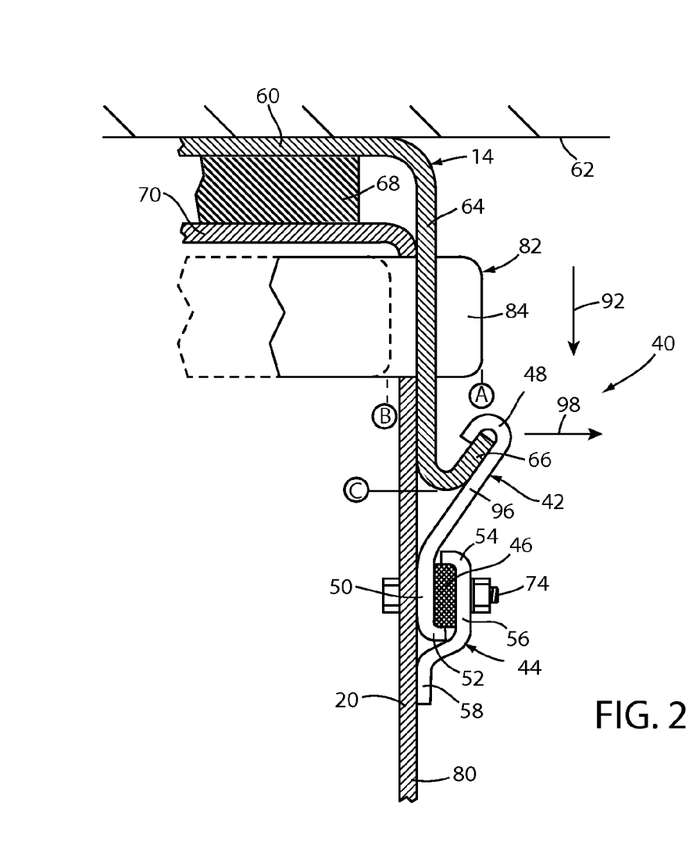
FIG. 2 is a cross-sectional end view of the coupling arrangement, with a vehicle frame rail shown at a standard operating height.
Figure 4:
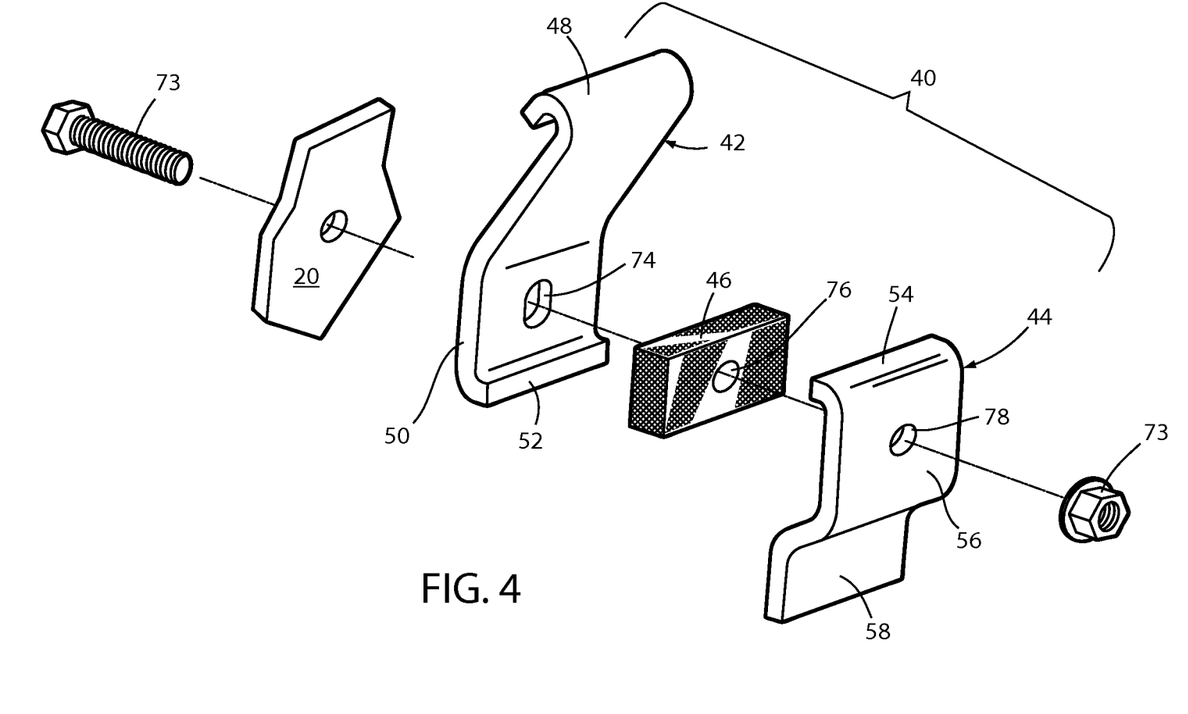
FIG. 4 is an exploded view of the coupling arrangement.

In assembly, a horizontal portion 60 of each of the vehicle frame rails 14 supports a vehicle floor member 62 such as a trailer floor member, and a vertical portion 64 extends downwardly therefrom terminating in an upwardly opening, C-shaped lower end 66. A slider pad 68 is positioned between a horizontal portion 70 of each of the slider rails 20 and the horizontal portions 60 of the vehicle frame rails 14, and facilitates the sliding movement of the slider arrangement 16 with respect to the vehicle frame assembly 12 in the directions 18. A mechanical fastener such as a nut and bolt combination 73 extends through an aperture 74 of the first bracket 42, an aperture 76 of the pad 46, and an aperture 78 of the second bracket 44 and an aperture (not shown) located along the length of the slider rail 20, thereby securing the coupling arrangement 40 to the slider rail 20 in a manner such that the C-shaped upper end 48 of the first bracket 42 engages the C-shaped lower end 46 of the vehicle frame rail 14, the body portion 50 of the first bracket 42 abuts a vertical portion 80 of the slider rail 20, and the bottom portion 58 of the second bracket 44 abuts the vertical portion 80 of the slider rail 20.

Figure 3A:
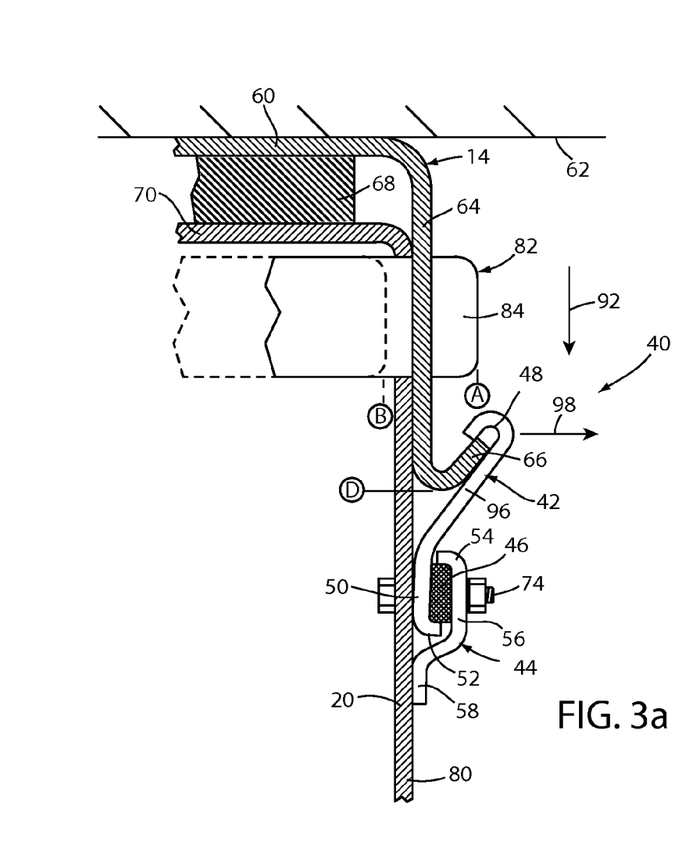
FIG. 3*a* is a cross-sectional end view of the coupling arrangement with the vehicle frame rail shown at a lowered height.
Figure 3B:
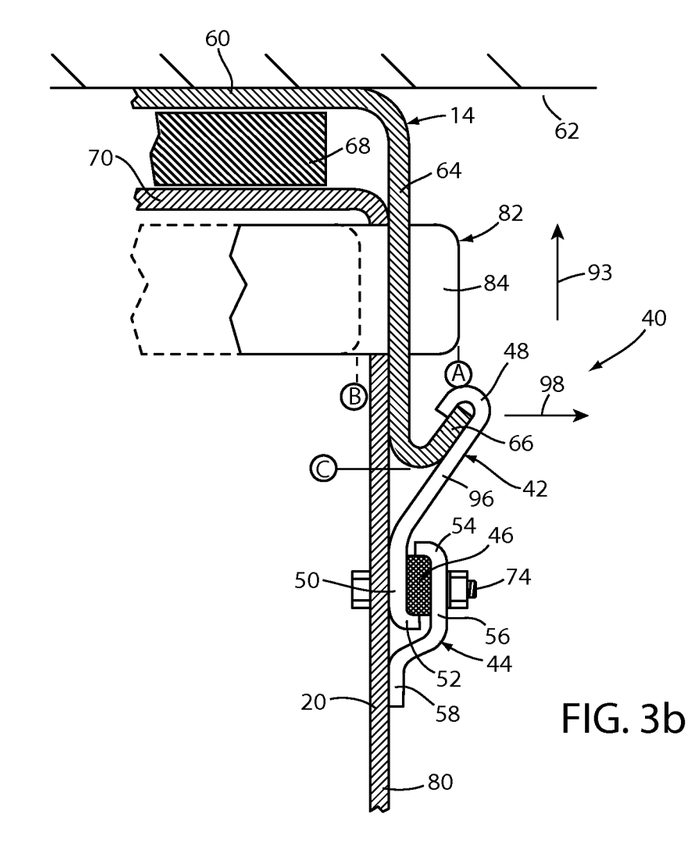
FIG. 3*b* is a cross-sectional end view of the coupling arrangement with the vehicle frame rail shown at a raised height.

In operation, the vehicle frame assembly 12 may be repositioned with respect to the slider arrangement 16 by disengaging a locking arrangement 82. Specifically, locking pins 84 may be moved from an engaged or locking position A, wherein the pins 84 extend through apertures in the slider rails 20 and the vehicle frame rails 14 thereby preventing relocation of the slider arrangement 16 with respect to the frame assembly 12, and an unlocked or disengaged position B, wherein the pins 84 are withdrawn from engagement with the apertures of the vehicle frame rails 14 thereby allowing the slider rails 20 to slide with respect to the vehicle frame rails 14. An aggressive repositioning of the slider arrangement 16 with respect to the vehicle frame assembly 12 by the operator may cause a significant collision between the slider arrangement 16 and a stop member (not shown) fixed of the vehicle frame rails 14, thereby causing a torqueing force in a downward directions 90 to be exerted on the vehicle frame assembly 12, and in turn causing a downward movement of portions of the slider rails 20 in a downward direction 92 from a normal operating height C (FIG. 2) to a lowered height D (FIG. 3a) and/or causing an upward movement of portions of the slider rails 20 in an upward direction 93 (FIG. 3b). Movement of the slider rails 20 in the direction 92 causes the lower end portion 66 of the slider rails 20 to impact an angled center portion 96 of the first bracket 42, thereby forcing the first bracket 42 in a downward direction 92 and/or the upper end 48 of the first bracket 42 outwardly in a direction 98. The downward movement and/or outward canting of the first bracket 42 in the directions 92, 98 results in a compression of the biasing member 46 between the first bracket 42 and the second bracket 44 as the lower end 58 of the second bracket 44 bears against the vertical portion 80 of the slider rail 20. The biasing member 46 returns the first bracket 42 to the original position once the slider arrangement 16 returns to the normal operating height C. In the preferred embodiment, the first bracket 42 and the second bracket 44 comprise a relatively non-deformable material, such as steel. However, in an alternative embodiment, the first bracket 42 may comprise an elastically resilient material, such as urethane, spring steel, and the like, and may be utilized either with or without the biasing member 46 and/or the second bracket 44.

Figure 5:
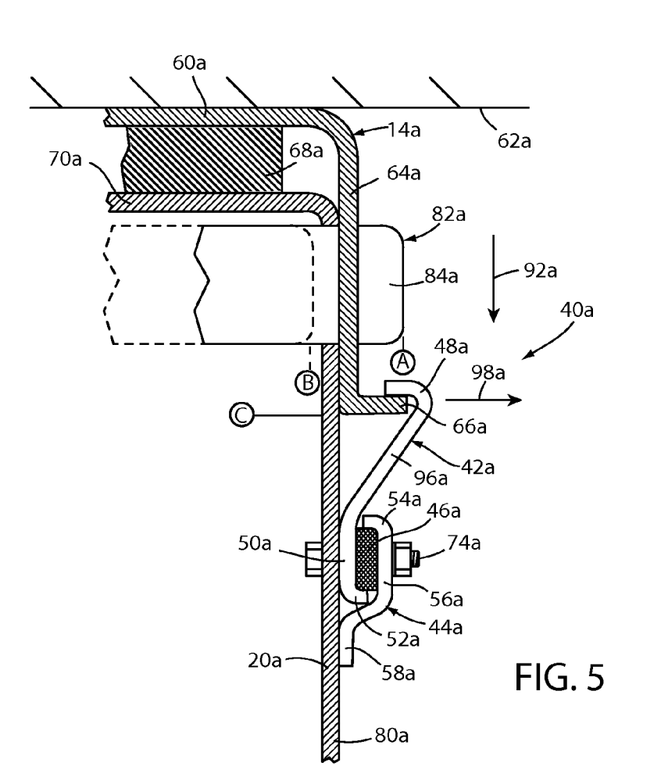
FIG. 5 is a cross-sectional view of an alternative embodiment of the coupling arrangement, with a frame rail shown at a standard height.
Figure 6A:
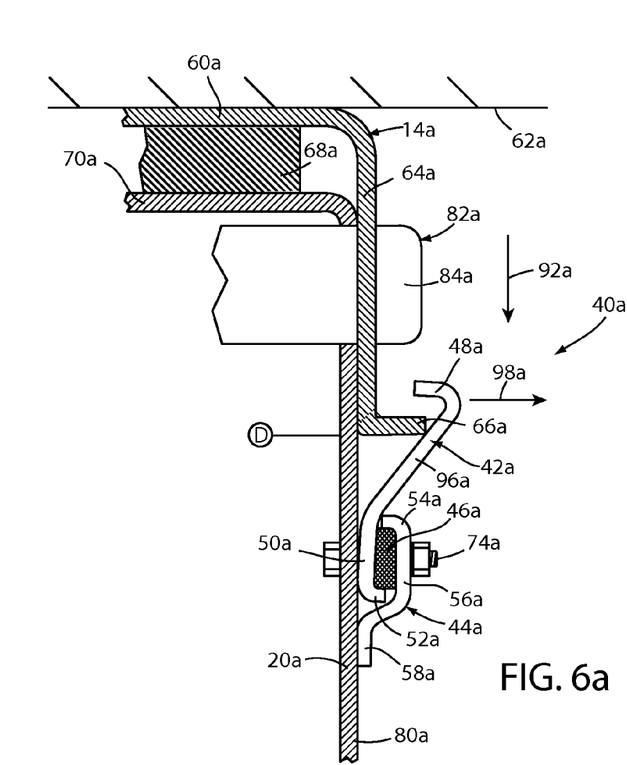
FIG. 6*a* is a cross-sectional view of the alternative embodiment of the coupling arrangement, with a frame rail shown at a lowered height.
Figure 6B:
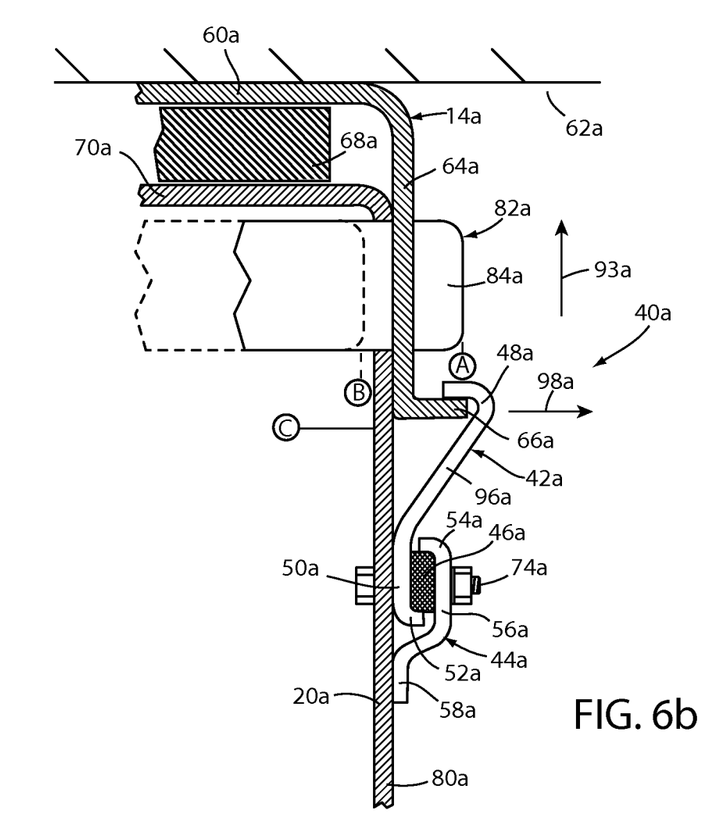
FIG. 6*b* is a cross-sectional view of the alternative embodiment of the coupling arrangement, with a frame rail shown at a raised height.
Figure 7:
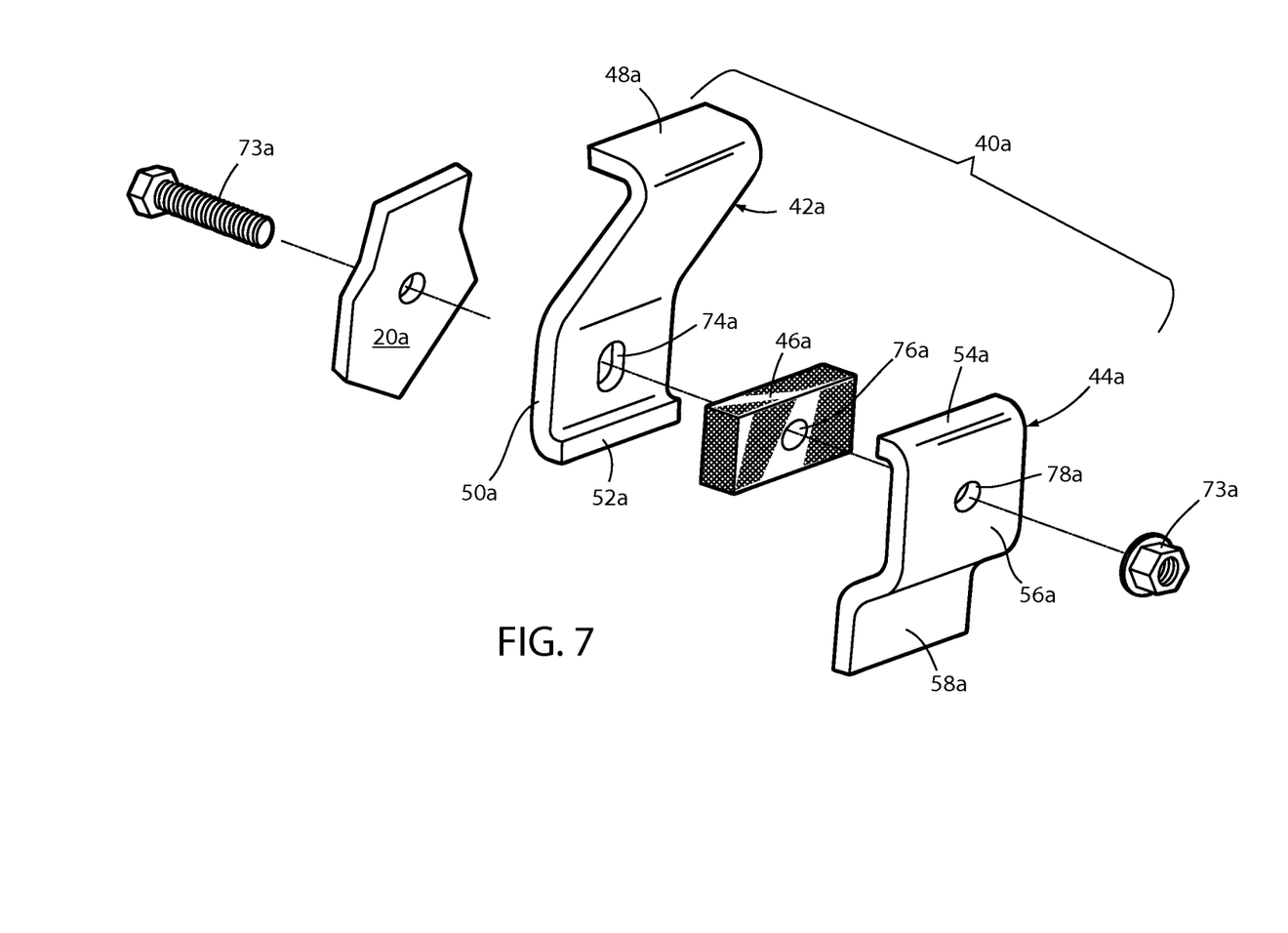
FIG. 7 is an exploded perspective view of the coupling arrangement.

The reference numeral 40a (FIGS. 5-7) generally designates an alternative embodiment of the coupling arrangement. Since the coupling arrangement 40a is similar to the previously described coupling arrangement 40, similar parts appearing in FIGS. 2-4 and FIGS. 5-7, respectively, are represented by the same, corresponding reference numeral, except for the suffix "a" in the numerals of the latter. Each coupling arrangement 40a includes a first bracket 42a, a second bracket 44a, and an elastically resilient biasing or bushing member 46a located therebetween. In the illustrated example, the first bracket 42a includes an inwardly-extending L-shaped upper end 48a, a planar body portion 50a, and an outwardly extending lip or bottom portion 52a. The second bracket 44a includes an inwardly curved upper portion 54a, a planar body portion 56a, and a downwardly extending body portion 58a inwardly offset from the body portion 56a. The biasing or bushing member 46a preferably comprises an elastomeric material, and more preferably comprises rubber or a urethane material. In operation, the coupling arrangement 40a functions similarly to the coupling arrangement 40 as described above. Specifically a downwardly directed force exerted in the direction 92a (FIG. 6a) causes a downward movement and/or outward canting of the first bracket 42a in the directions 92a, 98a resulting in a compressing of the biasing member 46a, while an upwardly directed force exerted in the direction 93a (FIG. 6b) causes an upward movement of the first bracket 42a in the direction 93a resulting in a compression of the biasing member 46a.

The reference numeral 40b (FIG. 8) generally designates another alternative embodiment of the coupling arrangement. Since the coupling arrangement 40b is similar to the coupling arrangement 40, similar parts appearing in FIGS. 2-4 and FIG. 8 are respectively represented by the same, corresponding reference numeral, except for the suffix "b" in the numerals of the latter. Each coupling arrangement 40b includes a first bracket 42b, a mounting arrangement 43b, and a shock absorber 47b located therebetween. In the illustrated example, the first bracket 42b includes an inwardly opening, C-shaped end 48b, and a body portion 50b. A clamping plate 51b cooperates with the body portion 50b via a bolt 53b to secure the shock absorber 47b to the first bracket 42b.

Figure 8:
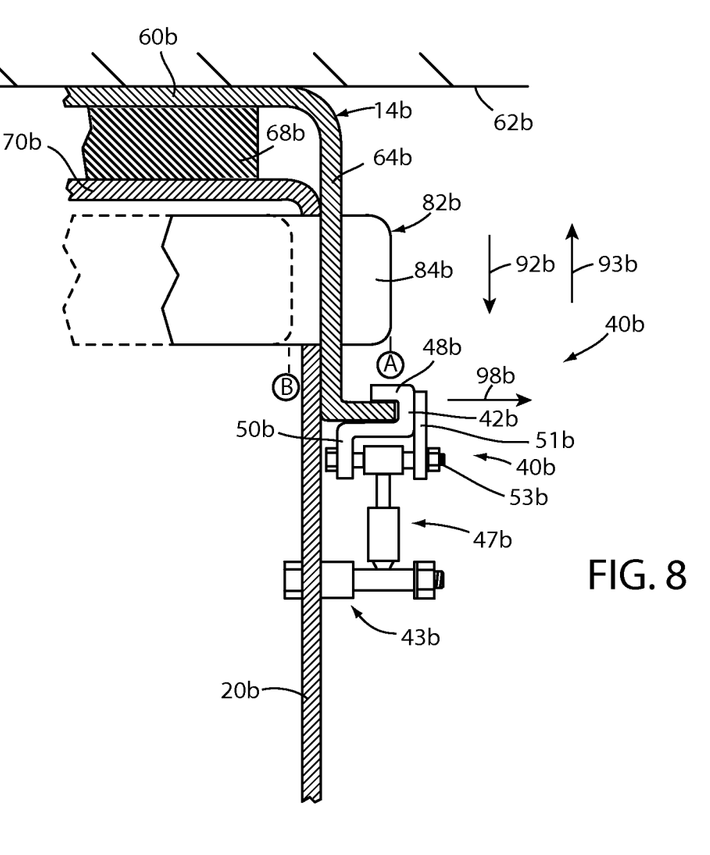
FIG. 8 is a cross-sectional end view of another alternative embodiment of the coupling arrangement.

In operation, the shock absorber 47b is configured to absorb the force exerted by the frame assembly 14b in the downward direction 92b, thereby allowing the first bracket 42b to move in a downward direction and prevent damage to the frame assembly 14b, the slider rail 20b, and the coupling arrangement 40b when the associated slider rails are either upwardly or downwardly deflected.

The present inventive vehicle suspension assembly provides a more durable arrangement that protects the associated components against impact loading and fatigue-type fractures that may develop leading to ultimate rupture in the overall structure.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle suspension assembly, comprising:
   a vehicle frame rail;
   a slide rail extending longitudinally along the vehicle frame rail and slidably adjustable with respect to the vehicle frame rail;
   a support bracket extending downwardly from the slide rail;
   a trailing arm pivotably coupled to the support bracket;
   a spring member positioned between the trailing arm and the slide rail; and
   an elastically resilient coupling arrangement coupling the slide rail to the vehicle frame rail, wherein the coupling arrangement is configured to elastically deform during vertical displacement of the vehicle frame rail with respect to the slide rail.

2. The vehicle suspension assembly of claim 1, wherein the coupling arrangement includes a first bracket that slidably engages the vehicle frame rail.

3. The vehicle suspension assembly of claim 2, wherein the first bracket includes a C-shaped portion that engages a flange of the vehicle frame rail.

4. The vehicle suspension assembly of claim 3, wherein the flange of the vehicle frame rail is C-shaped.

5. The vehicle suspension assembly of claim 2, wherein the first bracket is elastically resilient.

6. The vehicle suspension assembly of claim 2, wherein the coupling arrangement further includes an elastically resilient biasing member that is configured to elastically deform during vertical displacement of the vehicle frame rail with respect to the slide rail.

7. The vehicle suspension assembly of claim 6, wherein the coupling arrangement further includes a second bracket, and wherein the biasing member is positioned between the first and second brackets.

8. The vehicle suspension assembly of claim 7, wherein the second coupling bracket abuts the slide rail.

9. The vehicle suspension assembly of claim 6, wherein the biasing member comprises an elastomeric material.

10. The vehicle suspension assembly of claim 1, further comprising:
    a locking arrangement movable between a disengaged position that allows the slide rail to be slidably repositioned along the length of the vehicle frame rail, and an engaged position that prevents the slide rail from being repositioned along the length of the vehicle frame rail.

11. The vehicle suspension assembly of claim 1, wherein the coupling arrangement is configured to elastically deform as the vehicle frame rail and the slide rail are vertically displaced away from one another.

12. The vehicle suspension assembly of claim 1, wherein the coupling arrangement is configured to elastically deform as the vehicle frame rail and the slide rail are vertically displaced toward one another.

13. A vehicle suspension assembly, comprising:
    a slide rail configured to extend longitudinally along a vehicle frame rail and configured to slidably adjustable with respect to the vehicle frame rail;
    a support bracket extending downwardly from the slide rail;
    a trailing arm pivotably coupled to the support bracket;
    a spring member positioned between the trailing arm and the slide rail; and
    an elastically resilient coupling arrangement configured to couple the slide rail to the vehicle frame rail, wherein the coupling member is configured to elastically deform during vertical displacement of the vehicle frame rail with respect to the slide rail.

14. The vehicle suspension assembly of claim 13, wherein the coupling arrangement includes a first bracket that is configured to slidably engage the vehicle frame rail.

15. The vehicle suspension assembly of claim 13, wherein the first bracket includes a C-shaped portion that is configured to engage a flange of the vehicle frame rail.

16. The vehicle suspension assembly of claim 13, wherein the first bracket is elastically resilient.

17. The vehicle suspension assembly of claim 13, wherein the coupling arrangement further includes an elastically resilient biasing member that is configured to elastically deform during vertical displacement of the vehicle frame rail with respect to the slide rail.

18. The vehicle suspension assembly of claim 17, wherein the coupling arrangement further includes a second bracket, and wherein the biasing member is positioned between the first and second brackets.

19. The vehicle suspension assembly of claim 18, wherein the second coupling bracket abuts the slide rail.

20. The vehicle suspension assembly of claim 18, wherein the biasing member comprises an elastomeric material.

21. The vehicle suspension assembly of claim 13, wherein the coupling arrangement is configured to elastically deform as the vehicle frame rail and the slide rail are vertically displaced away from one another.

22. The vehicle suspension assembly of claim 13, wherein the coupling arrangement is configured to elastically deform as the vehicle frame rail and the slide rail are vertically displaced toward one another.

23. A coupling arrangement for use with a vehicle suspension assembly that includes a vehicle frame rail, a slide rail extending longitudinally along the vehicle frame rail and slidably adjustable with respect to the vehicle frame rail, a support bracket extending downwardly from the slide rail, a trailing arm pivotably coupled to the support bracket, a spring member positioned between the trailing arm and the slide rail, the coupling arrangement comprising:
    a first bracket configured to slidably engage the vehicle frame rail;
    a second bracket configured to abut the slide rail; and
    an elastically resilient biasing member positioned between the first and second brackets and that is configured to elastically deform during vertical displacement of the vehicle frame rail with respect to the slide rail.

24. The vehicle suspension assembly of claim 23, wherein the first bracket includes a C-shaped portion that is configured to engage a flange of the vehicle frame rail.

25. The vehicle suspension assembly of claim 23, wherein the biasing member comprises an elastomeric material.

26. The vehicle suspension assembly of claim 23, wherein the coupling arrangement is configured to elastically deform as the vehicle frame rail and the slide rail are vertically displaced away from one another.

27. The vehicle suspension assembly of claim 23, wherein the coupling arrangement is configured to elastically deform as the vehicle frame rail and the slide rail are vertically displaced toward one another.

* * * * *